Patented Mar. 24, 1942

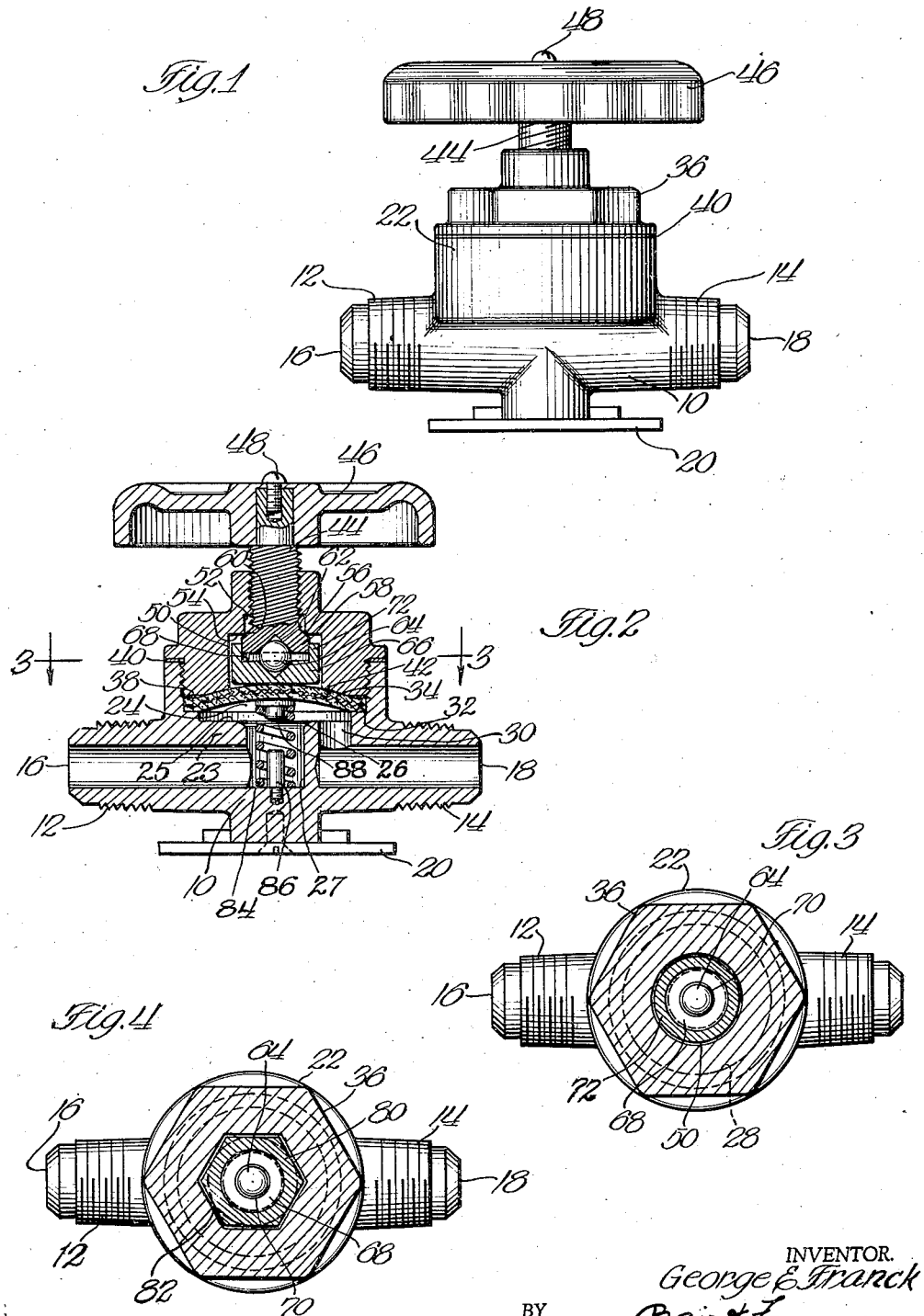

2,277,395

UNITED STATES PATENT OFFICE 2,277,395

DIAPHRAGM VALVE

George E. Franck, Riverside, Ill., assignor to The Imperial Brass Manufacturing Company, Chicago, Ill., a corporation of Illinois Application April 1, 1940, Serial No. 327,232

2 Claims. (Cl. 251—24)

My invention relates to diaphragm valves and particularly valves wherein the working parts and joints must be tightly sealed at all times, whether open or closed, against any leak or passage of fluid under relatively high pressures.

Among the objects of my invention is to provide a new and improved diaphragm valve which utilizes a relatively soft resilient diaphragm and which has incorporated therein a valve actuating mechanism of a swivel type which moves in a longitudinal direction against the diaphragm and which is prevented from rotating with relation to the surface of the diaphragm in order to minimize wear upon that member.

Another object of my invention is the provision of a new and improved diaphragm valve having a relatively thick resilient diaphragm shaped so as to normally assume a position away from the valve seat and which also includes a bonnet serving not only to secure the edge of the diaphragm in sealed relation to the valve but also providing a rounded surface complementary to the outer surface of the diaphragm and extending into the valve body so as to continuously exert a positive pressure against the diaphragm in open position, thereby preserving a resiliency of the diaphragm regardless of the pressure of any fluid with which the valve may be used.

A further object of my invention is the provision of a new and improved diaphragm valve having a relatively thick resilient diaphragm somewhat concave in shape adapted to seat upon an annular valve seat finished off in a smooth curve so that continued seating and reseating will not cause the diaphragm to deteriorate and which has in addition an auxiliary resilient means within the confines of the valve seat adapted to press against the diaphragm so as to normally urge it away from a seating position.

With these and other objects in view, my invention consists in the construction, arrangement and combination of the various parts of my device whereby the objects contemplated are attained, as hereinafter more fully set forth, pointed out in my claims and illustrated in the accompanying drawing, in which:

Figure 1 is an elevational view of the diaphragm valve.

Figure 2 is a longitudinal sectional view of the valve.

Figure 3 is a cross sectional view taken on the line 3—3 of Figure 2.

Figure 4 is a cross sectional view showing a modified form of interior at the same relative position as shown in Figure 3.

In view of the more or less recent demands for valves of a compact nature capable of withstanding relatively great fluid pressures, various types of diaphragm valves have been designed which are intended to serve not only as a compact valve but one of a practically leakless construction which will prevent any escape of fluid, especially under high pressure, even though other mechanisms of the valve might wear or become out of order.

Because of the great pressures encountered diaphragms must be provided which are not only flexible but also of a type which will withstand those great pressures and remain flexible regardless of operating conditions.

In order that such a diaphragm may maintain its initial strength and resistance, the valve should be so designed that regardless of how frequently it is turned on and off there will be no undue weakening of the diaphragm structure resulting from the wear of repeated operation.

In the drawing there is shown a valve 10 provided with threaded projections 12 and 14 in axial alignment wherein are ports 16 and 18 forming outlet and inlet ports depending on the direction of flow. A base 20 is supplied for mounting the valve upon some supporting surface.

The body of the valve is provided with a hollow cylindrical portion 22 forming a substantially cylindrical chamber 24. The bottom 28 of the chamber has an annular flat surface 25 and a pocket 27 forming a part of the passage between the port 16 and the valve interior. At the center the wall of the pocket 27 joins the flat surface forming a rounded edge 26. At one side of the flat surface is a short passage 30 communicating with the part 18. Surrounding the flat surface is an annular shoulder 32. A flexible resilient diaphragm 34 of substantial thickness is provided having an outer diameter about equal to the inside diameter of the cylindrical chamber 24 and designed to rest upon the annular shoulder. The diaphragm has a concave shape, normally bowed or curved in a direction away from the flat surface when the valve is assembled and adapted to seat upon the flat surface at the rounded edge 26.

For securing the diaphragm in place, the valve is provided with a bonnet 36 threadably secured within the chamber and which with the assistance of an annular ring 38 and an annular washer 40 securely presses and seals the diaphragm in place within the chamber. The bonnet has a concave lower face 42 of a curvature substantially the same as the curved upper surface of the diaphragm. The bonnet has a threaded portion 43 of such length that when it is screwed tightly into place it will seal the diaphragm and additionally provide a positive longitudinal thrust against the outer surface of the diaphragm to securely support it in place when in full open position.

Within the bonnet is a valve actuating device comprising a threaded stem 44 in which the threads may be customarily rather steep as exemplified by a triple thread to furnish a quickacting valve. The outer end of the stem is provided with a suitable handle wheel 46 which is non-rotatably attached to the stem by a screw 48.

The bonnet has a large central recess 50, a smaller recess 52 and a section 54 shown flat providing a corner 56 within the recess. There is provided on the valve stem an enlarged lower end 58 and a tapered face 60 which is designed to seat against the corner 56. At the bottom face of the stem is a depression 62 and in the depression is positioned a ball thrust bearing 64.

A foot piece 66 forming part of the actuating mechanism is loosely positioned within the recess 50. This foot piece has a space 68 designed to receive the bottom end of the stem and a depression 70 for reception of the ball thrust bearing. In addition, the foot piece is provided with flanges 72 at the sides surrounding the bottom end of the stem. These parts are shown in cross section in Figure 3.

To further insure proper working of the valve under all conditions there is provided a positive lift for the diaphragm. This is in the form of a coiled spring 84 centered within the passage 27. At the bottom is provided a spring keeper 86 secured within the passage and a cap 88 covers the top of the spring to furnish a smooth area of contact with the underside of the diaphragm.

When the valve is closed the foot piece 66 presses the diaphragm against the rounded corner 26 and the flat surface 25 immediately adjacent thereto which together form a seat. Movement of the foot piece downward compresses the spring at the same time. When the diaphragm is released it tends to spring back as a result of its inherent elasticity and at the same time is urged upward by the spring 84 so that there will be a positive opening even though the valve may be opened only a very small amount.

A modified form of the foot piece is shown in Figure 4 and in this form a foot piece 80 is shown hexagonal in cross section fitting within a hexagonal depression 82 in the bonnet so that it can move only longitudinally and cannot rotate. In other respects the modified form is similar to the form first described.

When the valve of Figures 2 and 3 is initially assembled and turned to a full open position, the parts occupy the position shown in Figure 2. When the valve is to be closed, the handle wheel is turned in a right-hand direction, forcing the stem and the foot piece longitudinally downward against the center of the diaphragm. During this endwise movement the foot piece due to either a slight frictional resistance on the face of the diaphragm or due to the hexagonal shape shown in Figure 4 remains non-rotatable by reason of the presence of the thrust bearing connecting it to the stem.

Therefore, a longitudinal movement only is given to the foot piece in order that it may be utilized to press the diaphragm directly against the annular valve seat. The valve can be turned to any partially opened position.

Upon releasing the diaphragm so as to open the valve to a full open position, the stem is turned in a left-hand direction until the tapered face of the stem back-seats against the corner within the recess in the bonnet. Under these circumstances should any rupture of the diaphragm occur in full open position there would be no escape of dangerous gas from the valve.

There has thus been provided a compact diaphragm valve which is efficient in its operation and so constructed as to produce only a minimum of wear upon the parts, making replacement of any of the few parts a simple and inexpensive procedure.

Some changes may be made in the construction and arrangement of the parts of my device without departing from the real spirit and purpose of my invention, and it is my intention to cover by my claims any modified forms of structure, or use of mechanical equivalents, which may be reasonably included within their scope.

I claim as my invention:

1. A diaphragm valve comprising a body having a cylindrical chamber and a flat bottom therefor, an annular valve seat concentrically positioned in the plane of said bottom, inlet and outlet passages to the chamber, an annular shoulder in the chamber surrounding said valve seat and located in a plane parallel to and spaced from the plane of said valve seat, a relatively thick resilient diaphragm on said shoulder having the center thereof concave relative to the valve seat and normally springing away from the seat to maintain the valve open, a bonnet threadably secured in said chamber pressing against the edge of the diaphragm to seal it in position against the shoulder, said bonnet having a central recess, means forming an annular corner at the bottom of the recess, a threaded passage through the bonnet and a valve actuating device comprising a threaded stem in the passage having a handle, a tapered face adapted to backseat in full open position of the valve against the annular corner, a depression at the inner end of the stem, a ball thrust bearing in the depression and a foot piece having a complementary bearing depression and sides surrounding said inner end of the stem and a relatively flat face normally in contact with the diaphragm for pressing said diaphragm into closed position against the valve seat when thrust inward by rotation of the valve stem.

2. A diaphragm valve comprising a body having a cylindrical chamber and a flat bottom therefor, an annular valve seat concentrically positioned in the plane of said bottom, inlet and outlet passages to the chamber, an annular shoulder in the chamber surrounding said valve seat and located in a plane parallel to and spaced from the plane of said valve seat, a relatively thick resilient diaphragm on said shoulder having the center thereof concave relative to the valve seat and normally springing away from the seat to maintain the valve open, a bonnet threadably secured in said chamber pressing against the edge of the diaphragm to seal it in position against the shoulder, said bonnet having a central recess, means forming an annular valve seat at the bottom of the recess, a threaded passage through the bonnet and a valve actuating device comprising a threaded stem in the passage having a handle, a valve element tapered relative to said second valve seat adapted to backseat in open position of the valve against said last seat, a foot piece having sides surrounding said inner end of the stem, a swivel thrust bearing between the stem and the foot piece and a relatively flat face normally in contact with the diaphragm for pressing said diaphragm into closed position against the valve seat when thrust inward by rotation of the valve stem.

GEORGE E. FRANCK